United States Patent

Marzocchi

[15] 3,658,571
[45] Apr. 25, 1972

[54] GLASS FIBER REINFORCED ELASTOMERS

[72] Inventor: Alfred Marzocchi, Cumberland, R.I.
[73] Assignee: Owens-Corning Fiberglas Corporation
[22] Filed: Apr. 29, 1970
[21] Appl. No.: 32,974

[52] U.S. Cl. ...................... 117/65.2, 117/72, 117/115, 117/126 GB, 118/427, 118/DIG. 18
[51] Int. Cl. ............................................. C03c 25/02
[58] Field of Search .............. 117/72, 65.2, 115, 126 GB; 118/427, DIG. 18

[56] References Cited

UNITED STATES PATENTS

| 3,546,000 | 12/1970 | Medney | 117/115 X |
| 3,413,186 | 11/1968 | Marzocchi | 117/72 X |
| 1,933,401 | 10/1933 | Ward | 118/427 X |
| 3,244,545 | 4/1966 | Marzocchi et al. | 117/115 X |
| 3,367,793 | 2/1968 | Atwell | 117/126 GB |

Primary Examiner—William D. Martin
Assistant Examiner—D. Cohen
Attorney—Staelin & Overman and Herman I. Hersh

[57] ABSTRACT

Glass fibers for use in glass fiber-reinforced elastomeric materials and method for preparing same wherein a glass fiber bundle is first impregnated with an elastomer or resinous polymer and then is coated with an elastomer compatible material to form an impregnated glass fiber bundle having an inner coating comprising an elastomer or resinous polymer and an outer coating of the elastomer compatible material.

10 Claims, 4 Drawing Figures

Patented April 25, 1972
3,658,571
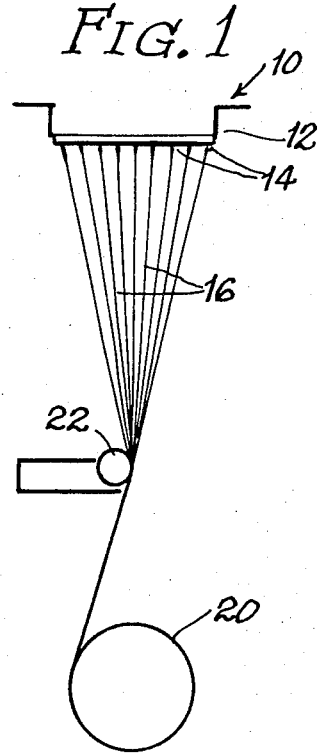
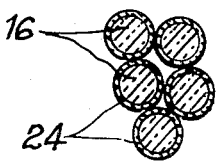
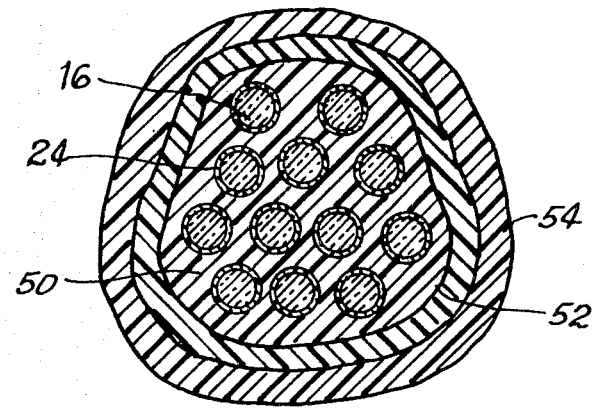
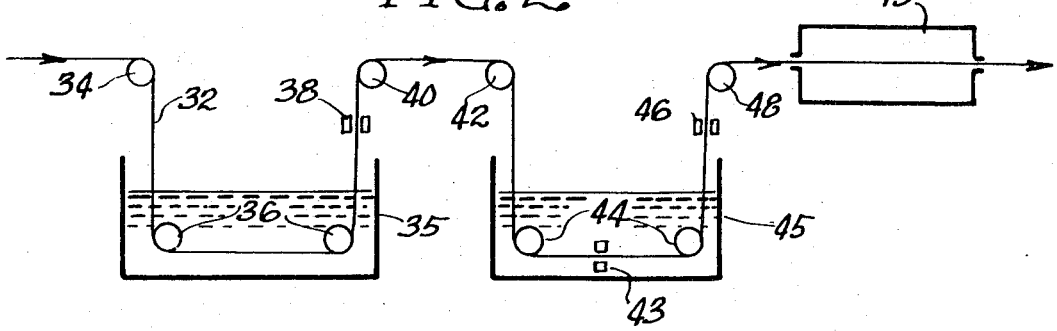
INVENTOR
Alfred Marzocchi
by Staelin and Overman
Attys

GLASS FIBER REINFORCED ELASTOMERS

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination with the elastomeric materials.

The term "glass fibers," as used herein, shall refer to (1) continuous fibers formed by the rapid attentuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam of air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a silver which is drafted into a yarn; and to woven and non-woven fabrics formed of such yarns of discontinuous fibers, and (3) combinations of such continuous and discontinuous fibers in strand, yarn, cord and fabrics formed thereof.

As used herein, the term "elastomer" is meant to include natural rubber in the cured or uncured stage, vulcanized or unvulcanized stage, and synthetic organic elastomeric materials such as butadiene-styrene copolymer, butadiene-acrylonitrile copolymer, chloroprene, isoprene, neoprene, isobutyl rubber and the like, elastomeric polymers and copolymers in their cured or uncured stages, and vulcanized or unvulcanized stages. Included also are the EPDM rubbers, such as formed by the interpolymerization of ethylene, an alpha-monoolefin having from three to 20 carbon atoms, such as propylene, and a polyene, such as dicyclopentadiene, 1-4 hexadiene and preferably an alkylene or alkylidene norbornene, such as 5-alkylidene-2-norbornene and the like in which the alkylidene group numbers from two to 12 carbon atoms, and polysulfone rubber.

The invention is addressed to the fuller utilization of the desirable characteristics of glass fibers, such as their high strength, flexibility, thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life, wearability, and service characteristics in rubber tires, and as a reinforcement and the like in other elastomeric coated fabrics and molded elastomeric products.

It is an object of this invention to provide a new and improved method for treatment of glass fibers in the form of yarns, cords, strands and fabrics, hereinafter referred to as bundles, wherein the individual glass fibers may or may not contain a thin size coating thereon, to enable fuller utilization to be made of the desirable characteristics of the glass fibers when used in combination with elastomeric materials in the manufacture of glass fiber reinforced molded products and coated fabrics.

More specifically, it is an object of this invention to provide a method for the treatment of glass fibers to improve the processing and the performance characteristics of the glass fibers as a reinforcement for elastomeric materials and for treatment of bundles, strands, yarns, cords and fabrics of glass fibers, to enhance their bonding relationship when used in combination with elastomeric materials in the manufacture of glass fiber reinforced plastics, laminates or coated fabrics and it is a related object to provide a method and means for making fuller utilization of the strength properties of glass fibers when used as a reinforcement for elastomeric materials.

These and other objects and advantages of this invention will hereinafter appear and, for purposes of illustration, but not of limitation, an embodiment of the invention is shown in the accompanying drawing in which FIG. 1 is a flow diagram showing the manufacture of continuous glass fibers and the treatment thereof in forming to improve the processing characteristics of the glass fibers and to improve the performance characteristics of the glass fibers when used in combination with elastomeric materials in the manufacture of glass fiber reinforced elastomeric products;

FIG. 2 is a flow diagram illustrating the treatment of glass fibers subsequent to their being formed into bundles, strands, yarns, cords or fabrics to impregnate the glass fiber bundles in accordance with the preferred practice of this invention;

FIG. 3 is a cross-sectional view of glass fibers processed in accordance with the diagram illustrated in FIG. 1; and FIG. 4 is a cross-sectional view of a bundle of glass fibers processed in accordance with the flow diagram of FIG. 2.

To the present, glass fibers which have been added or otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties have been made available from the combinations which made use of glass fibers in products formed or elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

In copending application, Ser. No. 398,305, filed Sept. 22, 1964, description is made of a method for impregnating glass fibers in the form of yarns, strands, cords or fabrics wherein the glass fiber bundle is impregnated with a resorcinol aldehyde latex which penetrates the glass fiber bundle to separate the fibers one from the other and to prevent destruction of the fibers by mutual abrasion. When the impregnated glass fiber bundle is combined with elastomeric materials in the manufacture of glass fiber-reinforced elastomeric products, the resorcinol aldehyde latex operates to intertie the glass fiber bundle with the elastomeric material.

The resorcinol aldehyde latex system, hereinafter referred to as "RFL" has the disadvantage that the amount of RFL loaded in the glass fiber bundle as an impregnant is limited by the tendency of the RFL impregnant to be dislodged when the glass fiber bundle is subjected to a change in direction, as when the bundle is passed over the roller or the like. In addition, the RFL system as applied in the aforementioned copending application has the further disadvantage that it results in a high degree of variation in the tensile strength of the glass fiber bundle when under compressive forces.

It has now been found that the tensile strength of glass fibers can be unexpectedly increased by treating glass fibers in the form of a bundle with an elastomer or an elastomer compatible resin prior to impregnation with RFL, or other similar elastomer compatible impregnant whereby a glass fiber bundle having more than one coating and having improved characteristics for use in the manufacture of glass fiber-reinforced elastomeric products is produced.

The following examples will serve to illustrate the principal concepts of this invention in a method for the treatment by impregnation of glass fiber bundles wherein the glass fibers have preferably, though not necessarily, been sized in forming with a conventional size composition which has preferably been modified to embody a glass fiber anchoring agent.

EXAMPLE 1

Forming Size Composition 8.0% by weight partially dextrinized starch
1.8% by weight hydrogenated vegetable oil
0.4% by weight cationic wetting agent(lauryl amine acetate)
0.2% by weight nonionic emulsifying agent
1.0% by weight gamma aminopropyltriethoxy silane
99.6% by weight water

EXAMPLE 2

Forming Size Composition 3.2% by weight saturated polyester resin
0.1% by weight fatty acid amine wetting agent(Nopcogen 16 L)
0.1% by weight polyvinyl alcohol
3.0% by weight pyrrolidine
0.3%by weight gamma-aminopropyltriethoxy silane
0.1% by weight glacial acetic acid
93.2% by weight water

EXAMPLE 3

Forming Size Composition 0.2% by weight paraffin wax in aqueous emulsion
1.3% by weight cationic amide polyester resin
2.3% by weight polyglycol condensate(300 to 400 m w )
0.25% by weight gelatin
0.5% by weight gamma-aminopropyltriethoxy silane
0.1% by weight dibasic ammonium phosphate
0.2% by weight glacial acetic acid
95.15% by weight water

EXAMPLE 4

Forming Size Composition 0.5% by weight beta-aminoethyl-gamma-aminopropyl-triethoxy silane
0.25% by weight fatty acid amine wetting agent
99.25% by weight water Referring now to the schematic diagram of FIG. 1, the glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 16 by winding the filaments about a rapidly rotating drum 20. The filaments 16 are sized with one of the size compositions of Examples 1 to 3 as they are gathered together to form a strand. For this purpose, use is made of an applicator 22 which is illustrated as a wiping pad that is constantly wet with the forming size composition. The filaments of glass are each wet with the size composition as they are gathered together to form the strand 18 that is wound about the drum 20.

The sized strands are allowed to air dry so drying of the thin size coating can be accelerated by exposure to elevated temperature such as a temperature within the range of 150° to 250° F. The applied size forms a very thin coating 24 on the surface of the glass fibers 16 to impart a desired balance of lubricity and bonding without destroying the fibrous characteristic or appearance of the fiber.

The strand 18 of sized glass fibers is preferably plied with other strands and twisted to form yarns, threads, or cords which may be used as a reinforcement for elastomeric materials, with or without cutting to shorten lengths, and which can be formed into woven or non-woven fabrics for subsequent combination with elastomeric materials.

After the fibers have been processed into strands, yarns, cords or fabrics, hereinafter referred to generally as bundles, the bundles of sized glass fibers are treated in accordance with the process of the present invention as represented by the following examples.

EXAMPLE 5

A first impregnating composition is formulated as follows:

| 25.0% by wt. | Natural rubber latex (40% solids) |
|---|---|
| 75.0% by wt. | Water. |

Impregnation with the aqueous composition of Example 5 may be made by conventional means, such as by immersion of the bundles of glass fibers in a bath of the impregnating composition. Referring specifically to FIG. 2 of the drawing, the glass fiber bundle 32 is advanced over a guide roller 34 for passage downwardly to the bath 35 containing the impregnating composition of Example 5. The bundle is then turned under roller 36 to effect a sharp bend which operates to open the bundle to enable fuller penetration of the aqueous impregnating composition into the bundle of sized glass fiber for fuller impregnation of the bundle. The impregnated bundle is then raised from the bath for passage through a roller or die 38 which operates to remove excess impregnating composition from the bundle and to work the impregnant into the bundle.

Thereafter, the endless bundle is advanced over roller 40 to roller 42 for passage downwardly into a bath 45 containing the following composition:

30.0% by weight natural rubber latex-resorcinol formaldehyde resin (38% solids) "Lotol 5440"
70.0% by weight water The bundle is turned under rollers 44 and is passed through orifice die 43 which is somewhat smaller than die 38 whereby the passage of said strand 32 through die 43 causes turbulence in the orifice, as well as turbulence immediately before and after the orifice, so that a layer comprising a mixture of RFL and natural rubber latex is deposited on the glass fiber bundle 32. The bundle is then passed through the remainder of the RFL bath whereby RFL is deposited on the top of the binary layer to form a third layer comprising RFL, the excess of which may be removed by an orifice die 46 having a somewhat larger diameter. Thereafter, the bundle is advanced over roller 48 into a drying oven preferably in the form of an air drying oven maintained at a temperature above ambient temperature, and preferably at a temperature within the range of 150° to 350° F. to accelerate removal of the aqueous composition and to set the impregnating material in situ in the glass fiber bundle. However, drying will occur in a relatively short period, ranging from 1–30 minutes, depending somewhat upon the temperature of the drying oven. It will be understood that the bundle can be subjected to dielectric treatment to coagulate the latex, thereby effecting little or no drying.

It will be appreciated that limited benefits may be obtained through the use of the concepts of the present invention wherein die 43 is omitted from treating bath 45. In this embodiment, as will be appreciated, the glass fiber bundle will contain an inner coating in the form of an elastomer impregnant and an outer coating in the form of the elastomer compatible material.

The resulting bundle is shown in FIG. 4 and comprises an inner layer 50 of natural rubber in which the glass fibers 16 having size coating 24 are dispersed, an intermediate layer 52 on top of layer 50 comprising a binary mixture of RFL and natural rubber and an outer layer 54 comprising the RFL. However, it will be understood that glass fibers may be subjected to the treatment described in Example 4 without having first been treated with a sizing composition.

Suitable resorcinol formaldehyde resins and combinations thereof with natural rubber latex are marketed by the U.S.Rubber Company under the tradename of "Lotol 5440." For the preparation of same, reference can be made of Canadian Patent No. 435,754, wherein description is made of the reaction of resorcinol and formaldehyde in the presence of a substantial amount of short-chained alkyl amines for the purpose of stabilizing the reaction and the products formed thereof, as well as the combination of the formed resin with rubber latex.

By way of modification, it is possible, and sometimes desirable to include in the elastomer latex impregnating composition one or more vulcanizing agents to vulcanize the latex during drying. For this purpose, use can be made of conventional vulcanizing agents such as sulfur, monochloride, selenium, tellurium, thiuram disulfides, polysulfide polymers, zinc oxide, magnesium oxide, organic peroxides as well as a variety of others. The vulcanizing agent can be employed in amounts up to about 15 percent by weight of the latex.

It will be appreciated that other elastomers may be employed in place of the natural rubber shown in Example 5, as represented by the following example.

EXAMPLE 6

| 20.0% by wt. | Butadiene-styrene copolymer latex(40% solids) |
| --- | --- |
| 80.0% by wt. | Water |

Application to glass fibers which do not contain a size coating thereon is made in the same manner as set forth above in Example 5 and in an amount to deposit dry solids comprising 1–10 percent by weight of the glass fibers. Subsequent treatment with RFL is made in the same manner as shown in Example 5 in an amount such that the RFL constitutes 2–15 percent by weight of the glass fiber-elastomer system. It will be appreciated that the amount of RFL present in the binary intermediate layer may be effectively controlled by means of the size of the orifice or die 43, and the amount of RFL constituting the outer layer may be effectively regulated by controlling the amount of RFL solids present in bath 45 and the size of the orifice or die 46. Impregnant compositions of the elastomer and RFL generally contain 5–25 percent solids by weight.

In accordance with another concept of the present invention, RFL may be replaced by another elastomer compatible impregnating composition such as one of the type described in U.S. Pat. No. 3,424,608, as illustrated by the following example.

EXAMPLE 7

| 20.0% by wt. | Neoprene rubber latex (50% solids) |
| --- | --- |
| 78.0% by wt. | Water |
| 1.0% by wt. | Sulfur |
| 1.0% by wt. | Zinc oxide |

Application of the neoprene latex is made in the manner described in Example 5. While the bundle is still wet with the neoprene latex, the bundle is passed into bath 45 which contains the following elastomer compatible composition.

| | Parts by weight |
| --- | --- |
| Resorcinol formaldehyde resin | 2–10 |
| Formaldehyde (37% solution) | 1–3 |
| Concentrated ammonium hydroxide | 2–5 |
| Vinyl pyridine terpolymer (42% solids) | 15–50 |
| Neoprene rubber latex (50% solids) | 25–50 |
| Butadiene latex (60% solids) | 5–15 |
| Alkali metal hydroxide | 0.05–0.2 |

Water is incorporated into the foregoing materials in amounts to produce an impregnating composition having a minimum solids content of 10 percent by weight and a maximum solids content of 50 percent by weight. Application is made in the manner illustrated in FIG. 2.

The vinyl pyridine terpolymer is a terpolymer of about 15 parts pyridine, 70 parts butadiene and 15 parts styrene, and is more fully described in the aforementioned patent. However, it will be understood that the vinyl pyridine terpolymer may be used alone to provide the elastomer compatible component in the glass fiber bundle. This concept of the present invention is illustrated by the following example.

EXAMPLE 8

Glass fibers impregnated with the neoprene rubber latex of Example 7 are, while still wet with the neoprene latex, passed into bath 45 which contains the following composition.

| 25.0% by wt. | Vinyl pyridine-butadiene-styrene terpolymer (42% solids) |
| --- | --- |
| 75.0% by wt. | Water |

Application of this impregnant to provide a triple coated glass fiber bundle may be made in the manner described in Example 5 which reference to the RFL system.

In accordance with a further concept of the invention, the elastomer comprising the inner layer of the coating may be replaced by a resinous polymer as illustrated by the following examples.

EXAMPLE 9

| 25.0% by wt. | Polyamide (Nylon) (50% solids) |
| --- | --- |
| 75.0% by wt. | Water |

Application of this composition is made in the same manner as shown in Example 5 whereby the polyamide forms the inner layer of the sized glass fibers. While still wet with the polyamide impregnant, the bundle is passed to an RFL bath having an orifice die immersed therein to cause turbulence in the vicinity of the die so as to form a triple coated bundle with a polyamide-RFL binary mixture forming the intermediate layer and RFL forming the outer layer.

If desired, alcohol solutions of the polyamides may be used instead of water suspensoids. It will also be understood that various other resinous polymers may be used in place of the polyamide, such as polyester, e.g. those formed by the reaction of a polybasic acid such as phthalic anhydride, maleic acid, fumaric acid and the like with a polyhydric alcohol such as glycerin, glycol and the like, phenolic-aldehydes such as phenol-formaldehyde resins, polyepoxides and acrylics.

It is desirable to achieve as full impregnation as possible into the bundles of glass fibers in order to more effectively separate the fibers one from the other by the impregnating materials since the solids are effective as a coating on the sized glass fibers to cushion the fibers and to protect the fibers against destruction by mutual abrasion. Thus, it is desirable to achieve as deep penetration as possible with the impregnating composition into the glass fiber bundle. The deeper the penetration, the more effective will be the bond between the glass fibers in the bundle and the elastomeric material with which the bundles of glass fibers are combined in the subsequent manufacture of the glass fiber-elastomeric product.

In the final system, the elastomeric material with which the glass fibers are combined will constitute a continuous phase. Such continuous phase of elastomeric material may comprise rubbers of the type incorporated into the impregnating composition or the elastomeric material can differ therefrom. The continuous phase of elastomeric material can be employed in the cured or uncured state or in the vulcanized or unvulcanized state. It is believed that the tie-in between the impregnated bundles of glass fibers and the elastomeric material forming the continuous phase will occur primarily during cure or vulcanization of the elastomeric material during the fabrication of the elastomeric material.

More complete protection of the individual glass fibers and a fuller coordination with the elastomeric material can be achieved when either the first or second or both of the impregnating compositions are formulated to contain an anchoring agent such as gamma-aminopropyltriethoxy silane. Instead of gamma-aminopropyltriethoxy silane, in the size or in the impregnating composition, use can be made of other organo silicon compounds containing an amino group, such as gamma-aminovinyldiethoxy silane, gamma-(triethoxysilylpropylamide)propylamine, N(gamma-triethoxysilylpropyl)propylamine, beta-aminoallyltriethoxy silane, and para-aminophenyltriethoxy silane. Use can be made of other organo silicon compounds in the form of a silane, silanol or polysiloxane polymers and copolymers(e.g. amino silane-organo silane copolymers) in which the organic group attached to the silicon atom contains an epoxy group, such as glycydoxypropyltrimethoxy silane or 3,4-epoxycyclohexylethyltrimethoxy silane. Instead of the organo silicon compounds, use can be made of a Werner complex compound in which the carboxylato group coordinated with the trivalent nuclear chromium atom contains an amino group or an epoxy group such as aminopropylato chromic chloride, glycine chromic complex, B-alanine chromic complex, or glycylate chromic chloride.

This concept of the present may be illustrated by the following examples.

EXAMPLE 10

30.0% Natural rubber latex(50% solids)
1.0% Gamma-aminopropyltriethoxy silane
69.0% Water The foregoing composition may be applied to a glass fiber bundle in which the individual glass fibers retain their original size. While the fibers are still wet with the latex, the bundle is treated with RFL which may or may not contain an anchoring agent.

EXAMPLE 11

An RFL composition containing an anchoring agent may be formulated as follows:

| | | |
|---|---|---|
| 25.0% | RFL | |
| 1.5% | Anchoring agent | |
| 73.5% | Water | |

When employing an anchoring agent in the impregnating compositions as illustrated by Examples 9 and 10, it is frequently advantageous to include a quaternary amino compound, such as tetramethyl ammonium hydroxide or tetra ethanol ammonium hydroxide, in order to impart improved stability to the impregnating compositions and to aid in maintaining the anchoring agent in solution.

In fabricating the combinations of the glass fibers treated in accordance with the practice of this invention, with elastomeric materials, the glass fibers or bundles of glass fibers are mixed with elastomeric material or otherwise laid down in the desired arrangement for combination with the elastomeric material as in the manufacture of rubber tires reinforced with cords of glass fibers. The combination of glass fibers and elastomeric material is processed in a conventional manner by molding or cure under heat and compression or by vulcanization for advancement of the elastomeric material to a cured or vulcanized stage while in combination with the treated glass fibers whereby the glass fibers or bundles of glass fibers become strongly integrated with the elastomeric material in the glass fiber elastomeric product.

It will be apparent that I have provided a new and improved method for use in the treatment of bundles of glass fibers to enhance their integration with elastomeric materials in the manufacture of glass fiber-elastomeric products.

It will be understood that invention exists not only in the treated glass fibers for use with elastomeric materials but that invention exists also in the process in which the compositions are employed in the treatment of glass fibers as well as the treated or impregnated glass fiber products formed thereof.

It will be understood that changes may be made in the details of formulation and methods of application for use without departing from the spirit of the invention, especially as defined in the following claims.

I claim:

1. In the manufacture of glass fiber-elastomeric products in which the elastomeric material comprises a continuous phase in which the glass fibers are distributed, the treatment of glass fibers which is effective to establish a strong bonding relationship between the glass fibers and the continuous phase elastomeric material comprising impregnating a glass fiber bundle with a first composition comprising a polymeric material selected from the group consisting of an elastomer and a resinous polymer selected from the group consisting of polyamides, polyesters, polyepoxides, phenolic aldehyde resins and acrylic resins to form an inner layer impregnant of said polymeric material in said glass fiber bundle, passing the glass fiber bundle which is still wet with said first composition into a bath of an elastomer compatible material, said bath having immersed therein an orifice through which said bundle is passed whereby turbulence is created in the vicinity of the orifice to intermix the elastomer compatible material with the polymeric material to provide an intermediate impregnant layer comprising a mixture of said polymeric material with an elastomer compatible material, and further coating the resulting bundle with an elastomer compatible material to form a top coating on said glass fiber bundle of said elastomer compatible material, said elastomer compatible material being selected from the group consisting of resorcinol aldehyde latex and a vinyl pyridine-butadiene-styrene terpolymer.

2. A method as defined in claim 1 wherein said inner layer impregnant constitutes 1–10 percent by weight of said glass fiber.

3. A method as defined in claim 1 wherein the top coating constitutes 2–15 percent by weight of the glass fiber-inner layer system.

4. A method as defined in claim 1 wherein at least one of said compositions contains an anchoring agent.

5. A glass fiber bundle having three impregnant layers therein, the first of said impregnant layers comprising a polymeric material selected from the group consisting of an elastomer and a resinous polymer selected from the group consisting of polyamides, polyesters, polyepoxides, phenolic aldehyde resins and acrylic resins, the second impregnant layer comprising a mixture of said polymeric material and an elastomer compatible material selected from the group consisting of a resorcinol aldehyde latex and a vinyl pyridine-butadiene-styrene terpolymer and the third impregnant layer comprising a top coating in the form of said elastomer compatible material.

6. A glass fiber bundle as defined in claim 5 wherein said inner coating constitutes 1–10 percent by weight of said glass fiber.

7. A glass fiber bundle as defined in claim 5 wherein said outer coating constitutes 2–15 percent by weight of the glass fiber-inner layer system.

8. A glass fiber bundle as defined in claim 5 wherein at least one of said polymeric material and said elastomer compatible material includes an anchoring agent.

9. In the manufacture of glass fiber elastomeric products in which the elastomeric material comprises a continuous phase in which the glass fibers are distributed, the treatment of glass fibers which is effective to establish a strong bonding relationship between the glass fibers and the continuous phase elastomeric material comprising impregnating a glass fiber bundle with a first composition comprising a polymeric material selected from the group consisting of polyamides, polyesters, polyepoxides, phenolic aldehyde resins and acrylic resins to form an inner layer impregnant of said polymeric material in said glass fiber bundle, passing the glass fiber bundle which is still wet with said first composition into a bath of an elastomer compatible material, said bath having immersed therein an orifice through which said bundle is passed whereby turbulence is created in the vicinity of the orifice to intermix the elastomer compatible material with the polymeric material to provide an intermediate impregnant layer comprising a mixture of said polymeric material with an elastomer compatible material, and further coating the resulting bundle with an elastomer compatible material to form a top coating on said glass fiber bundle of said elastomer compatible material, said elastomer compatible material being selected from the group consisting of resorcinol aldehyde latex and a vinyl pyridine-butadieneestyrene terpolymer.

10. A glass fiber bundle having three impregnant layers therein, the first of said impregnant layers comprising a polymeric material selected from the group consisting of polyamides, polyesters, polyepoxides, phenolic aldehyde resins and acrylic resins, the second impregnant layer comprising a mixture of said polymeric material and an elastomer compatible material selected from the group consisting of resorcinol aldehyde latex and a vinyl pyridine-butadiene-styrene terpolymer and the third impregnant layer comprising a top coating in the form of said elastomer compatible material.

* * * * *